United States Patent
Hahn et al.

(10) Patent No.: US 8,147,161 B2
(45) Date of Patent: Apr. 3, 2012

(54) JOINT ARRANGEMENT FOR A VEHICLE

(75) Inventors: Michael Hahn, Wallenhorst (DE); Thomas Herrmann, Belm (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 372 days.

(21) Appl. No.: 12/295,327

(22) PCT Filed: May 8, 2007

(86) PCT No.: PCT/DE2007/000844
§ 371 (c)(1),
(2), (4) Date: Sep. 30, 2008

(87) PCT Pub. No.: WO2007/128301
PCT Pub. Date: Nov. 15, 2007

(65) Prior Publication Data
US 2010/0221061 A1    Sep. 2, 2010

(30) Foreign Application Priority Data
May 9, 2006  (DE) .......................... 10 2006 021 870

(51) Int. Cl.
*F16C 11/00* (2006.01)

(52) U.S. Cl. ..... 403/122; 403/134; 74/422; 280/93.514; 180/428

(58) Field of Classification Search .................... 403/50, 403/51, 122–144, 298, 359.6; 280/93.511, 280/93.514, 93.515; 74/18, 12.1, 18.2, 422, 74/492, 493; 180/428
See application file for complete search history.

(56) References Cited

U.S. PATENT DOCUMENTS

| | | | | |
|---|---|---|---|---|
| 892,972 A * | 7/1908 | Bryce | | 411/267 |
| 4,218,933 A * | 8/1980 | Allen et al. | | 74/422 |
| 5,499,550 A * | 3/1996 | Westphal et al. | | 74/422 |
| 5,890,394 A * | 4/1999 | Anderson | | 74/422 |
| 6,579,025 B1 * | 6/2003 | Sokolihs et al. | | 403/44 |
| 6,598,697 B2 * | 7/2003 | Oishi | | 180/428 |
| 7,461,571 B2 * | 12/2008 | Tanaka | | 74/388 PS |
| 2002/0017419 A1 * | 2/2002 | Oishi | | 180/426 |
| 2003/0066415 A1 * | 4/2003 | Shteynberg | | 91/4 R |

FOREIGN PATENT DOCUMENTS

| | | |
|---|---|---|
| DE | 43 31 291 C1 | 12/1994 |
| JP | 63 104173 | 7/1988 |
| JP | 3-8066 | 1/1991 |
| JP | 5-37644 | 2/1993 |

* cited by examiner

*Primary Examiner* — Michael P Ferguson
*Assistant Examiner* — Eric Chau
(74) *Attorney, Agent, or Firm* — McGlew and Tuttle, P.C.

(57) ABSTRACT

A joint arrangement, for a vehicle, is provided with a joint (7), which has a joint housing (8) and a pivot pin (9) mounted movably in relation thereto. The arrangement also includes a rod (4), which has a cavity (6) and is connected to the joint (7); a sealing bellows (10), which defines an interior space (10) and in which the joint (7) is arranged at least partially; and a gas-permeable connection (13), which connects the cavity (6) of the rod (4) to the interior space (11) of the sealing bellows (10) and has at least one groove (15), which is formed in a front side (21) of the joint (7), which said front side faces the rod (4), opens into the interior space (11) and has a radially outer end (27). The groove (15) with its radially outer end ends at a spaced location from the outer circumferential contour of the front surface (21).

20 Claims, 5 Drawing Sheets

JOINT ARRANGEMENT FOR A VEHICLE

CROSS REFERENCE TO RELATED APPLICATIONS

This application is a United States National Phase application of International Application PCT/DE 2007/000844 and claims the benefit of priority under 35 U.S.C. §119 of German Patent Application DE 10 2006 021 870.1 filed May 9, 2006, the entire contents of

FIELD OF THE INVENTION

The present invention pertains to a joint arrangement for a vehicle, with a joint, which has a joint housing and a pivot pin, which is mounted movably in relation to this; a rod, which has a cavity and which is connected to the joint; a sealing bellows, which defines an interior space and in which the joint is arranged at least partially; and a gas-permeable connection, which connects the cavity of the rod to the interior space of the sealing bellows and has at least one groove, which is formed in a front side of the joint, which front side faces the rod, opens into the interior space and has a radially outer end.

BACKGROUND OF THE INVENTION

Such joint arrangements are known from the state of the art and are used, e.g., for rack-and-pinion steerings, wherein the sealing bellows protects at least part of the joint arrangement from environmental effects and dirt. Pressure fluctuations, which can be compensated via the gas-permeable connection, may occur within the sealing bellows during motions of the toothed rack.

A hinge joint, which is connected in one piece to an axial connection pin, which has an external thread and is screwed into a hollow toothed rack with a corresponding internal thread, is known from DE 43 31 291 C1. The toothed rack is in contact, after it has been mounted, with a radial flange, into which the connection pin passes over on the side of the ball and socket joint housing. Vent grooves, which pass over into the radial flange, are prepared in the connection pin.

JP 5-37644 discloses a connection between a hollow rod and a housing, wherein a groove is prepared in the wall of the rod on the front side. Furthermore, two grooves, which are located opposite each other, are formed at the inner wall of the rod in the area of a thread.

JP 63-104173 discloses a joint arrangement with a joint, which is connected to a hollow rod by means of a pin via a screw connection. An axial groove, which extends in a thread, is formed in the pin, and the axial groove passes over into a radial groove formed in a radial flange of the pin, which said radial flange is provided with a wrench surface.

JP 3-8066 discloses a ball and socket joint, whose housing bottom has an axially offset flange with an axially projecting pin, which meshes with a hollow rod. Radial grooves, which pass over into axial grooves, which are formed in the jacket surface of the pin, are prepared in the flange provided with a wrench surface.

The drawback of the latter two solutions is that grooves extend through wrench surfaces, and grooves combined with wrench surfaces lead to complicated contours, at which burs and increased tool wear may develop.

SUMMARY OF THE INVENTION

Based on this state of the art, the basic object of the present invention is to perfect the joint arrangement mentioned in the introduction such that complicated contours, on which burs or increased tool wear occur, can be avoided.

The joint arrangement according to the present invention for a vehicle, especially a motor vehicle, has a joint, which comprises a joint housing and a pivot pin mounted movably in relation thereto; a rod, which has an interior space and which is connected to the joint; a sealing bellows, which defines an interior space and in which the joint is arranged at least partially; and a gas-permeable connection (fluid passage), which connects the cavity of the rod to the interior space of the sealing bellows and comprises at least one groove, which is formed in a front side of the joint facing the rod, opens into the interior space and has a radially outer end, wherein the groove ends with its radially outer end at a spaced location, especially at a radially spaced location, from the outer circumferential contour or outer edge of the front side. The groove is preferably closed at its radially outer end, and it is closed especially on the front side and/or in the radial direction.

Since the gas-permeable connection to the radially outer end of the groove ends at a spaced location from the outer circumferential contour of the front side or front surface, it can be avoided that the groove would pass through the outer circumferential contour of the front side. The joint can thus have a jacket surface or outer circumferential surface, which surrounds or encircles the front side or the groove formed in the front side, without the groove passing through this jacket surface. The drawbacks and limitations mentioned in connection with the state of the art can thus be avoided. In particular, the gas-permeable connection opens via the radially outer end into the interior space of the sealing bellows. The at least one groove may now extend completely in the front side.

The jacket surface is preferably designed as a wrench surface or surrounds same, which has, e.g., a polygonal, especially tetragonal, hexagonal or octagonal circumferential contour or shape. The outer circumferential contour of the front side may lie on the jacket surface or wrench surface. Furthermore, the at least one groove extends at right angles or radially to the longitudinal direction of the rod and may have a straight shape. The longitudinal direction of the rod coincides especially with the longitudinal direction of the joint arrangement, so that the term "radial" preferably designates a direction at right angles or perpendicular to the longitudinal direction. Furthermore, the term "axial" designates especially a direction that is parallel to the longitudinal direction or a direction coinciding with this.

The radially outer end of the groove preferably has a smaller radial distance from the longitudinal direction than the outer circumferential contour of the front surface. Since the groove opens into the interior space especially with its radially outer end, this may be located radially outside a jacket surface of the rod or radially outside the radial extension of the jacket surface of the rod. Since the rod is preferably in contact with the front side, the outer end of the groove is arranged especially radially outside a contact surface, by means of which the rod is in contact with the front surface. The contact surface may have a ring-shaped design and surround or encircle a radially inner area, starting from which the groove extends, e.g., up to the radially outer end. Furthermore, the groove preferably has a radially inner area or a radially inner end, starting from which the groove extends up to the radially outer end. The radially inner area or the radially inner end of the groove has especially a smaller distance from the longitudinal direction than the radially outer end of the groove and is preferably located within the area enclosed by the contact surface or can be encircled by this. Furthermore, the radially outer end of the groove is preferably arranged radially between and especially at a radially spaced location from an outer circumferential contour of the contact surface and the outer circumferential contour of the front surface.

The rod may be connected to the pivot pin, which has the front surface and at or in which the groove extends. However, the rod is preferably connected to the joint housing, which has the front side and at or in which the groove is formed. The groove may be provided at or in a bottom of the joint housing, which is located opposite an opening, through which the pivot pin protrudes from the joint housing. The bottom is made especially in one piece with the joint housing. Furthermore, the bottom preferably has the front side of the joint, which said front side faces the rod.

The joint housing has, in particular, a housing recess, which is defined by a housing wall and in which the pivot pin is seated. A bearing shell, which is arranged in the joint housing and in which the pivot pin is mounted, may be inserted. Furthermore, a plurality of grooves, e.g., two or three grooves, may be provided, which are especially of the same design but are rotated relative to one another about the longitudinal direction.

The gas-permeable connection may have at least one second groove, which adjoins the (first) groove at least indirectly or directly, and which extends at least in some areas or completely within the rod and opens into the cavity. The two grooves preferably do not extend in parallel to one another. In particular, the second groove extends in the direction of or in parallel to the longitudinal axis of the rod (axial direction), whereas the first groove may extend obliquely or at right angles to the longitudinal axis (radial direction). The first groove and/or the second groove preferably have a straight shape. Furthermore, a helical shape of the first and/or second groove is possible. The two grooves may pass over into one another and form together especially an L-shaped groove shape or an L-shaped groove. The transition between the two grooves is formed especially in the radially inner area or at the radially inner end of the first groove.

The joint preferably has an axial pin, which meshes with the cavity of the rod. The pin is seated, in particular, at the front surface and may be made in one piece with the joint housing. The pin is preferably provided with an external thread and screwed into the rod, which has for this especially an internal thread, which meshes with the external thread. The pin is preferably connected to the bottom or is made in one piece with same.

The second groove may be formed at the inner wall of the rod. However, since the joint housing preferably has the pin meshing with the cavity, the second groove is formed especially in the jacket surface of the pin. The second groove extends, e.g., from an end of the pin, which faces away from the joint housing and is especially a free end, up to the front surface and/or to the first groove. If the joint and the rod are screwed together, the second groove preferably extends in or in the area of the external thread of the pin or of the internal thread of the rod. Furthermore, a plurality of (second) grooves, especially two or three (second) grooves, which are especially of the same design but are rotated relative to one another about the longitudinal direction, may be formed at the pin and/or at the inner wall of the rod.

Three radial grooves, which form an angle of 120° with one another, are preferably provided in the front side formed at the housing. Furthermore, three axial grooves may extend in the pin, these three axial grooves forming an angle of 120° with one another and joining the radial grooves such that a total of three L-shaped grooves, which form an angle of 120° with one another and open both into the cavity of the rod and into the interior space of the sealing bellows, are formed from the six grooves. The radial grooves end with their radially outer ends at a spaced location from the outer circumferential contour of the front surface and, in particular, do not pass through the outer circumferential contour. Furthermore, the rod can be in contact on the front side by a contact surface with the front side of the housing, which said front side faces the rod, the radially outer ends of the radial grooves being located radially outside the contact surface and being open towards the interior space. The radially outer ends of the radial grooves are located especially radially within the outer circumferential contour of the front surface.

The rod may be connected to a steering gear and moved by means of the steering gear, especially displaced in the longitudinal direction of the rod. The rod is preferably designed as a toothed rack, which forms a rack-and-pinion steering or rack-and-pinion steering gear together with the steering gear. The sealing bellows may be sealingly in contact with the steering gear or with a housing of the steering gear, on the one hand, and with the pivot pin or with a coupling member connected thereto, on the other hand.

The joint is preferably a ball and socket joint, so that the pivot pin is designed as a ball pivot, which is mounted with its joint ball rotatably and pivotably in the joint housing.

The cavity formed within the rod extends especially in the longitudinal direction of said rod and preferably extends up to the front side of the rod, which said front side faces the joint. The cavity may be axially defined or designed as a blind hole within the rod. As an alternative, the cavity may extend through the entire rod. Furthermore, a plurality of cavities may be provided in the rod. It is likewise possible for the rod to be connected to a second joint and to extend between these two joints. The two joints may be of the same design now.

Since the grooves described here are part of a gas-permeable connection or form same, they are preferably free grooves.

The present invention will be described below on the basis of a preferred embodiment with reference to the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
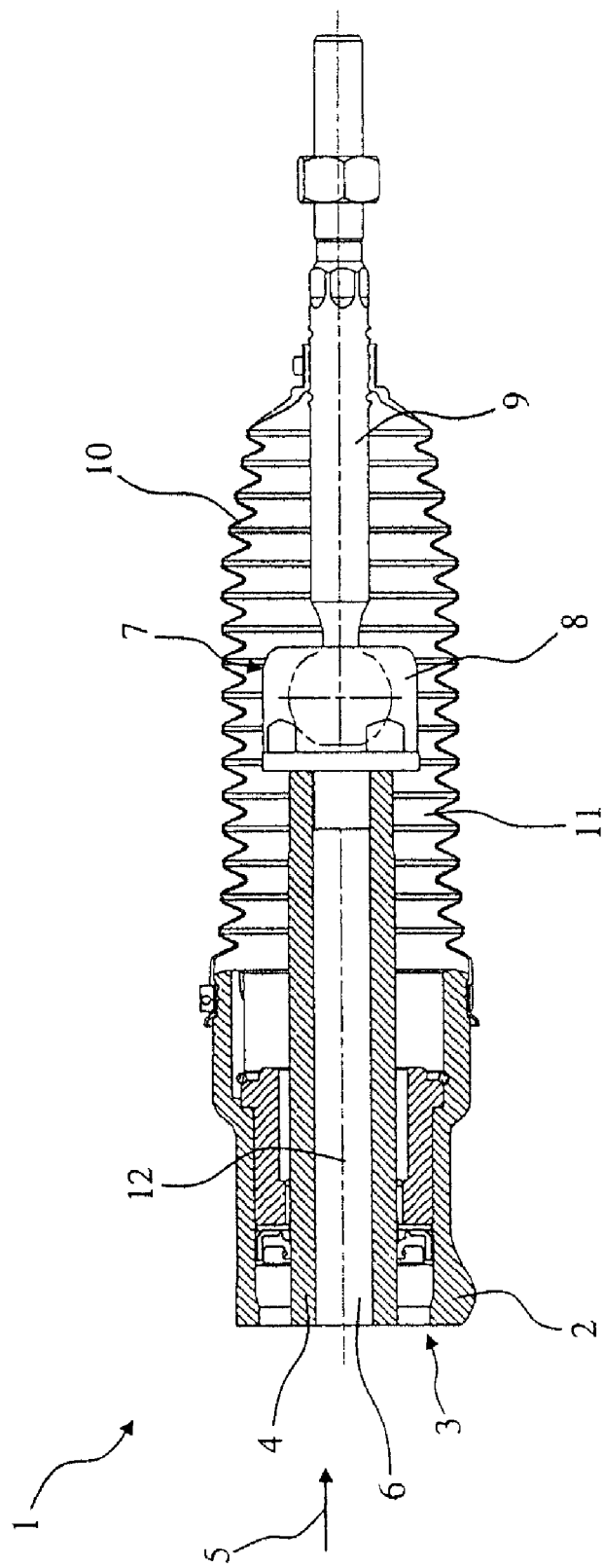
FIG. 1 is a partially cut-away sectional view of a rack-and-pinion steering with joint arrangement according to the invention.

Referring to the drawings in particular, FIG. 1 shows a partially cut-away view of a rack-and-pinion steering 1, in which a toothed rack 4, which is displaceable by means of the steering gear 3 in the direction of arrow 5 and opposite the direction of arrow 5, is mounted in a housing 2 of a steering gear 3. The toothed rack 4 has a recess 6 and is connected at one end to a ball and socket joint 7. The ball and socket joint 7 has a joint housing 8 and a ball pivot 9, which is mounted rotatably and pivotably in same and which is seated with a joint ball 18 (see FIG. 2) in a housing recess 16 (see FIG. 2), which is formed in the joint housing 8 and is defined by a wall 17 (see FIG. 2) of the joint housing 8. The ball pivot 9 extends here through an opening 19 (see FIG. 2) provided in the ball and socket joint housing 8 and protrudes from said ball and socket joint housing 8, and a sealing bellows 10 is sealingly in contact by one end with the ball pivot 9 outside the ball and socket joint housing 8. With its other end, the sealing bellows 10 is sealingly in contact with the housing 2 of the steering gear 3, so that an interior space 11, which is defined by the sealing bellows 10 and in which the ball and socket joint housing 8, an end area of the toothed rack 4 as well as a part of the ball pivot 9 are arranged, is formed between the two ends of the sealing bellows 10. The longitudinal axis of the toothed rack 4 is designated by reference number 12, and arrow 5 extends in parallel to or in the direction of the longitudinal axis 12.

If the toothed rack 4 is displaced in the direction opposite the direction of arrow 5 by means of the steering gear 3, the sealing bellows 10 is compressed or flattened, which may lead to an increase in the pressure of the air present in the interior space 11 of the sealing bellows 10. If, by contrast, the toothed rack 4 is displaced in the direction of arrow 5 by means of the steering gear 3, the sealing bellows 10 designed as a bellows is stretched or expanded, which may lead to a drop in the pressure of the air present in the interior space 11 of the sealing bellows 10. To enable such pressure fluctuations to be compensated, the rack-and-pinion steering 1 has a gas-permeable connection 13 (see FIG. 2), which connects the cavity 6 of the toothed rack 4 to the interior space 11 of the sealing bellows 10 in such a way that air can flow through. Air can thus be removed from the interior space 11 through the cavity 6 or air can be fed into the interior space 11. If the cavity 6 does not extend through the entire toothed rack 4, the air or the compensating gases can be bypassed, e.g., via the housing 2 of the steering gear 3.

Figure 2:
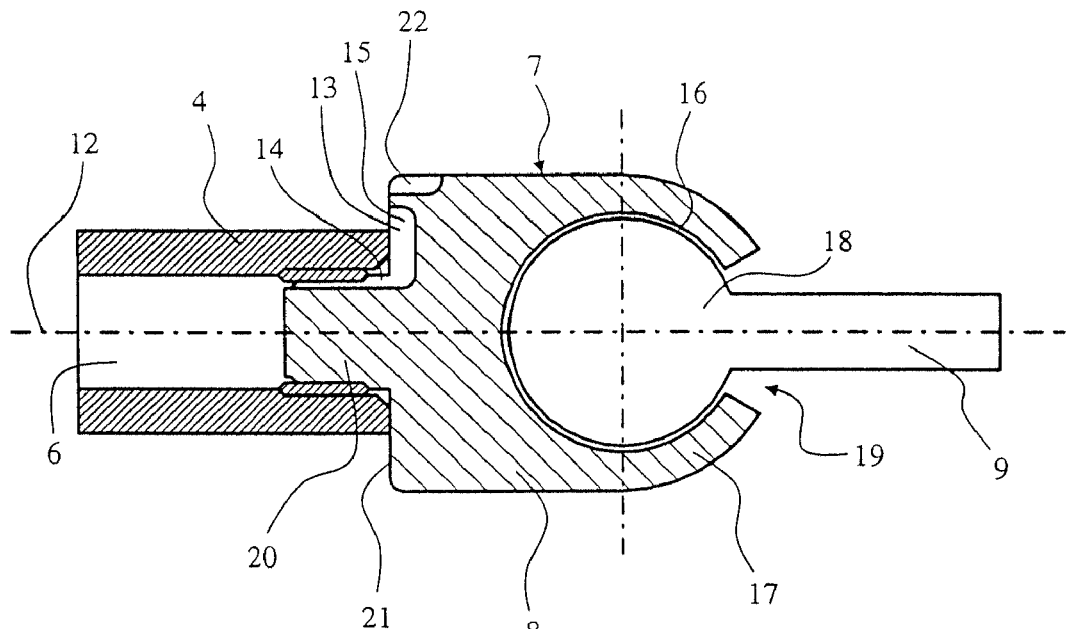
FIG. 2 is a sectional view of a ball and socket joint for the rack-and-pinion steering according to one embodiment of the present invention.

FIG. 2 shows a sectional view of the ball and socket joint 7 of the rack-and-pinion steering 1 according to one embodiment of the present invention, in which the cavity 6 is connected to the interior space 11 of the sealing bellows 10, which is not shown here, via the gas-permeable connection 13 such that air can flow through.

The joint housing 8 has an axial pin 20, which is made especially in one piece with same and which is provided with an external thread and meshes with the cavity 6 of the toothed rack 4. An internal thread, which meshes with the external thread of pin 20, is formed in the area of the end of the toothed rack 4, which said end faces the ball and socket joint 7, on the inner wall of said toothed rack 4. The ball and socket joint housing 8 and the toothed rack 4 are thus screwed together. Furthermore, the ball and socket joint housing 8 has a front side 21, which faces the toothed rack 4, surrounds the pin 20 in a ring-shaped manner and with which the toothed rack 4 is in contact on the front side.

The gas-permeable connection 13 has at least one groove 14 formed on the jacket surface of pin 20 and at least one groove 15, which is formed in the front side 21 and passes over at the housing-side end of pin 20 into the groove 14 and is in connection with same in such a way that air can flow through. Groove 14, which extends especially axially, preferably extends from the front side 21 of the joint housing 8 up to a front side of pin 20, which said front side faces away from the joint housing 8 and opens into the recess 6. Furthermore, groove 14 extends, at least in some sections, in or in the area of the external thread of pin 20. The at least one groove 15, which extends in the front surface 21, extends radially from pin 20 towards the outside and opens in a radially outer end area 27 (see FIG. 3) into the interior space 11 of the sealing bellows 10, which is not being shown here. However, groove 15 does not extend here up to the outer circumferential contour 28 (see FIG. 4) of the front surface 21, but is located at a distance 29 (see FIG. 4) therefrom.

The outer circumferential contour 28 is part of a polygonal wrench surface 22, which is formed on the jacket surface of the ball and socket joint housing 8 and extends in the axial direction over only part of the jacket surface of the ball and socket joint housing 8. The wrench surface 22 surrounds or encircles the groove or grooves 15 without these passing through the wrench surface 22.

Figure 3:
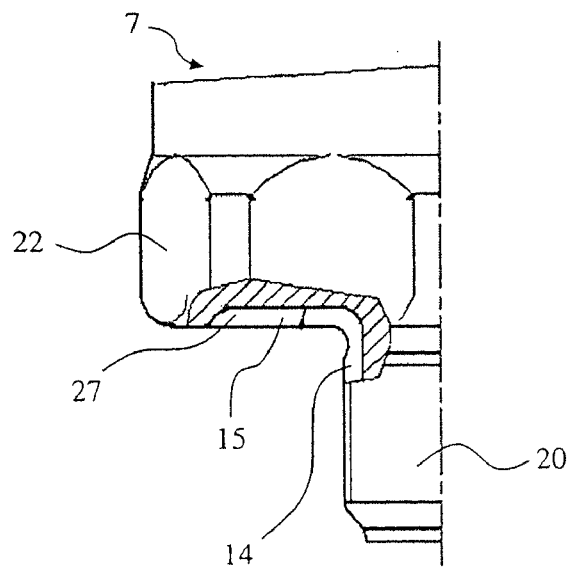
FIG. 3 is a side view of the ball and socket joint according to FIG. 2 with a partially cut-away view of a gas-permeable connection.

FIG. 3 shows a partial side view of the ball and socket joint housing 8 with the toothed rack 4 removed, wherein an L-shaped form of the grooves 14 and 15 passing over into one another is obtained, which form is shown partially in a sectional view. Groove 15 forms a right angle with groove 14.

Figure 4:
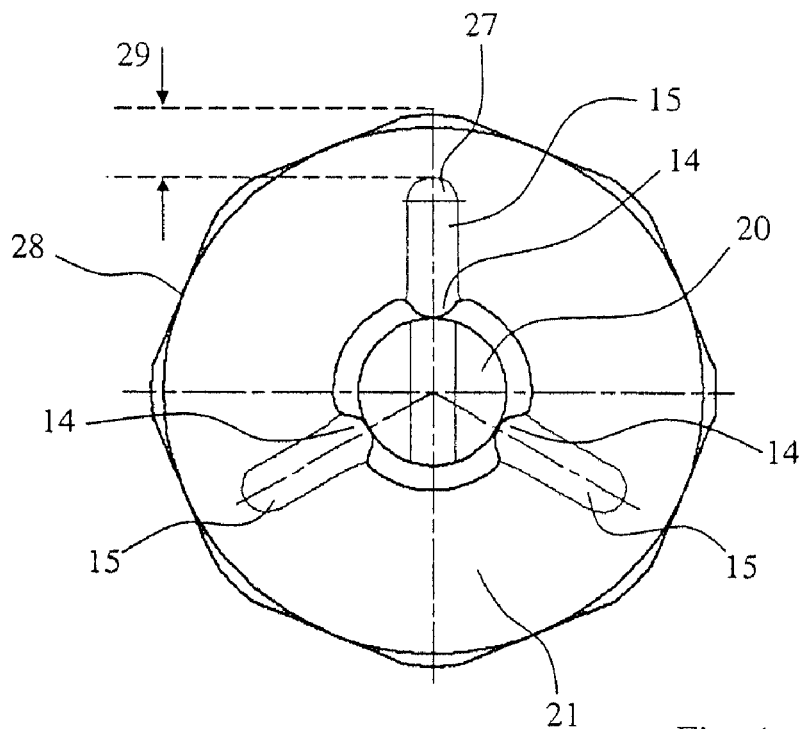
FIG. 4 is a top view of the front side of the ball and socket joint according to FIG. 2, which said front side faces the toothed rack.

FIG. 4 shows a top view of the front side 21 of the ball and socket joint housing 8 with the toothed rack 4 removed, where it becomes clear that three radial grooves 15 are provided according to this embodiment in the front side 21 and three axial grooves 14 on the pin 20. These six grooves 14 and 15 together form three L-shaped grooves, two adjacent grooves each of which form an angle of 120° with one another.

Figure 5:
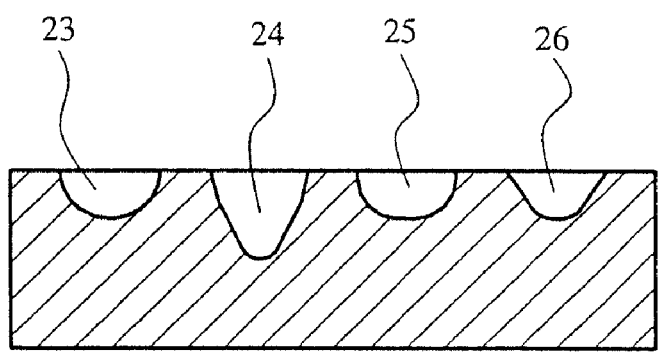
FIG. 5 is a sectional view showing a plurality of groove profiles.
Figure 6:
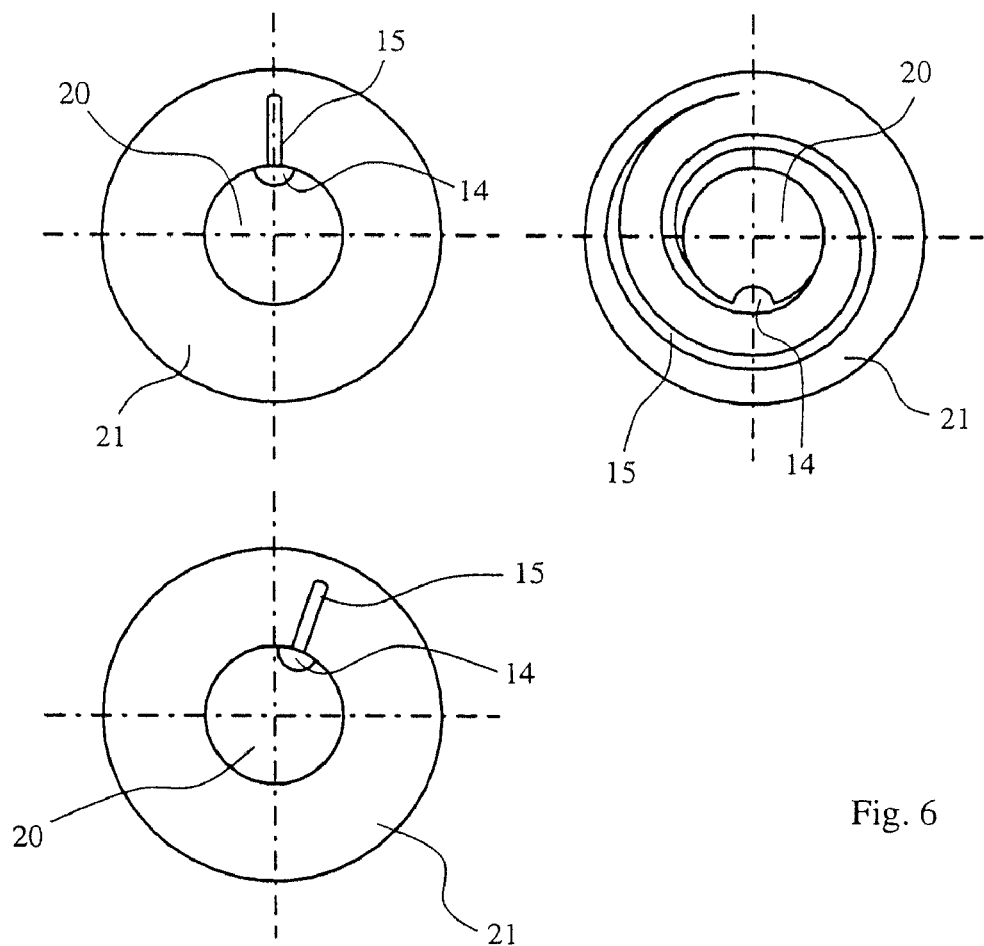
FIG. 6 is an end view showing a plurality of groove shapes.
Figure 7:
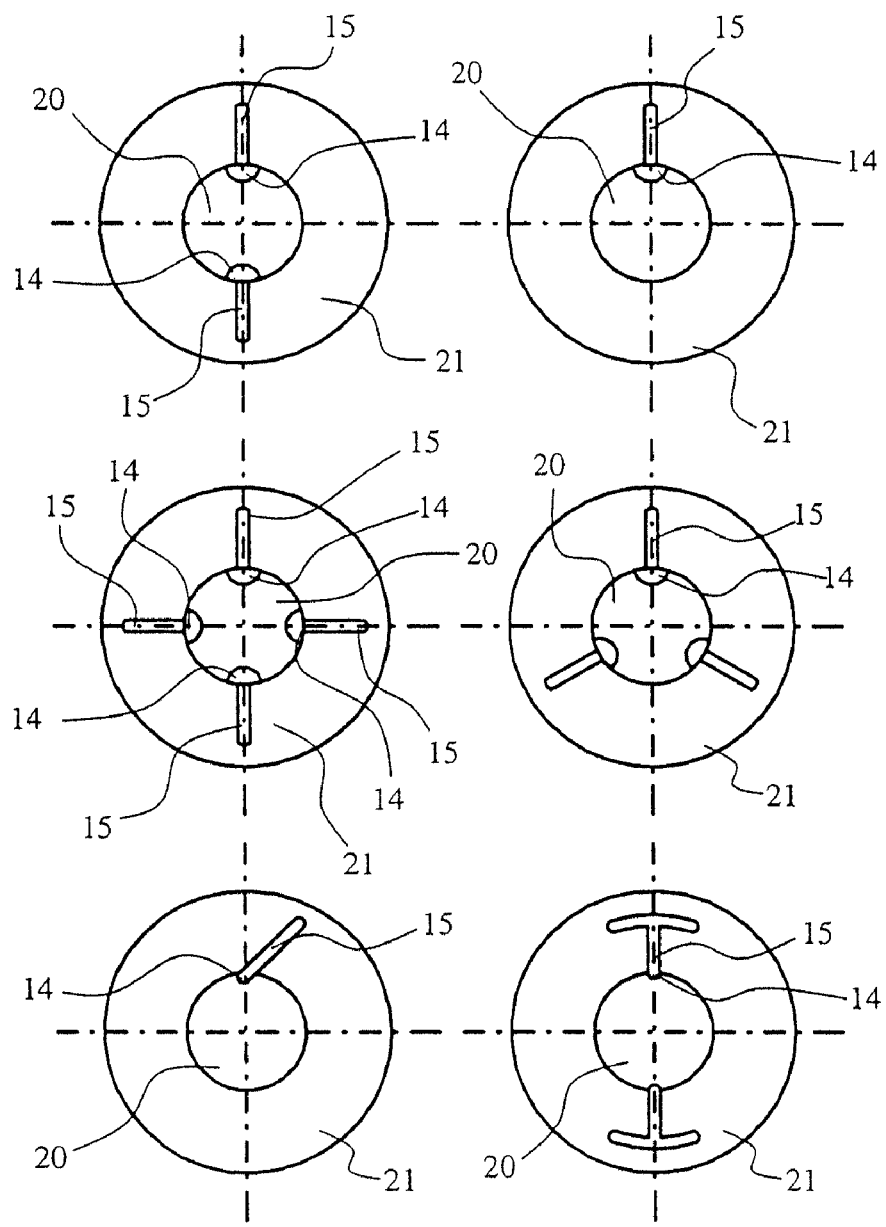
FIG. 7 is an end view showing different numbers of grooves.

The groove or grooves 15 extends/extend especially in the radial direction and may have one of the groove profile shapes 23, 24, 25 or 26 shown in FIG. 5 and/or one of the groove shapes shown in FIG. 6. In particular, it is seen in FIG. 6 that groove 15 may extend helically according to a variant of the embodiment. As an alternative, the groove or grooves 15 extends/extend in a straight line. Furthermore, FIG. 7 shows that a different number of grooves 15 may be provided. In addition, FIG. 7 also shows some different groove shapes.

The groove profile forms, groove shapes and/or numbers of grooves shown in FIGS. 5, 6 and 7 are correspondingly possible for the groove or grooves 14 provided on pin 20. Furthermore, groove 14 may be designed as a helical groove on the threaded pin 20.

Even though not shown, it is possible in all embodiments that a bearing shell (not shown), in which the joint ball 18 is mounted, is arranged within the recess 16 between the joint ball 18 and the housing wall 17.

While specific embodiments of the invention have been shown and described in detail to illustrate the application of the principles of the invention, it will be understood that the invention may be embodied otherwise without departing from such principles.

The invention claimed is:

1. A joint arrangement for a vehicle, the joint arrangement comprising:
    a joint comprising a joint housing, a pivot pin mounted movably in relation to said housing, said joint housing comprising a joint housing pin and a radial shoulder portion;

a rod having a cavity and an annular exterior surface, said rod being connected to said joint;
a sealing bellows defining an interior space, said joint being arranged at least partially in said interior space; and
a gas-permeable connection connecting said cavity of said rod to an interior space of said sealing bellows, said gas-permeable connection having an axially extending groove and at least one groove formed in an axial front side of said joint housing, wherein a surface of said joint housing pin defines said axially extending groove and a surface of said radial shoulder portion defines said at least one groove, said at least one groove extending in a radial direction with respect to a longitudinal axis of said joint housing, said front side of said joint facing said rod, and said at least one groove opening in the axial front side of the joint housing into said interior space at a radial location outside of said annular exterior surface and said at least one groove ending with a radially outer end at a spaced location from an outer circumferential contour of a front surface of said joint, said cavity, said at least one groove and said axially extending groove defining a fluid flow path.

2. A joint arrangement in accordance with claim 1, wherein said surface of said radial shoulder portion has a radially extending front side joint housing surface, said radially extending front side joint housing surface having a first radially extending surface portion and a second radially extending surface portion, said first radially extending surface portion defining at least a portion of said at least one groove, said second radially extending surface portion defining at least a portion of an outer circumferential portion of said joint housing, wherein a height of said second radially extending surface portion is greater than a height of said first radially extending surface portion.

3. A joint arrangement in accordance with claim 1, wherein said joint has a wrench surface encircling said groove formed in said front side, said gas-permeable connection comprising at least another groove formed in said front side of said joint housing, said at least another groove extending in said radial direction, said at least another groove being arranged at a spaced location from said at least one groove, said at least another groove ending with another radially outer end at a spaced location from said outer circumferential contour of said front surface of said joint, said at least another groove opening into said interior space at another radial location outside of said annular rod.

4. A joint arrangement in accordance claim 1, wherein said radially outer end of said groove is located radially outside said annular exterior surface of said rod, at least a portion of said rod being in contact with at least a portion of said front side, said radially outer end of said at least one groove being located at a spaced location from said annular exterior surface, wherein a length of said at least one groove is greater than a length of said contact surface of said rod, said at least another groove being located at 120 degrees from said at least one groove with respect to a circumferential direction of said joint housing.

5. A joint arrangement in accordance with claim 4, wherein said annular exterior surface has a ring-shaped design and surrounds a radially inner area, starting from which said at least one groove extends up to said radially outer end.

6. A joint arrangement in accordance claim 1, wherein said axially extending groove opens into said cavity of said rod.

7. A joint arrangement in accordance with claim 6, wherein the two grooves extend at right angles to one another and the second groove extends in the direction of or in parallel to a longitudinal axis of said rod.

8. A joint arrangement in accordance with claim 6, wherein said joint housing pin is arranged at said front surface, said joint housing pin engaging a surface of said cavity.

9. A joint arrangement in accordance claim 1, wherein said joint housing is connected to said rod and said joint housing has a housing recess, which is defined by a housing wall and in which said pivot pin is seated, wherein said front surface is provided at said joint housing and faces away from or is located opposite an opening, through which said pivot pin protrudes from the joint housing.

10. A joint arrangement in accordance claim 1, further comprising:
a steering gear wherein said rod is connected to said steering gear and can be moved by means of said steering gear.

11. A joint arrangement in accordance with claim 10, wherein said sealing bellows is sealingly in contact with said steering gear or with a housing of said steering gear, on the one hand, and with said pivot pin or with a coupling member connected thereto, on the other hand.

12. A joint arrangement in accordance with claim 1, wherein said rod is a toothed rack.

13. A joint arrangement in accordance with claim 1, wherein said joint is a ball and socket joint and said pivot pin is a ball pivot, which is mounted with a joint ball rotatably and pivotably in said joint housing.

14. A joint arrangement for a vehicle, the joint arrangement comprising:
a joint comprising a joint housing having a radial shoulder portion and an axial pin, said radial shoulder portion having a front side surface, said joint comprising a pivot pin mounted in said housing for pivotal movement, said axial pin having a surface defining an axially extending groove;
a rod having a cavity and an annular exterior surface, said rod being connected to said joint, said front side surface extending in a radial direction with respect to a longitudinal axis of said rod;
a sealing bellows defining an interior space, said joint being arranged at least partially in said interior space; and
a gas flow connection connecting said cavity of said rod to an interior space of said sealing bellows, said gas flow connection comprising said axially extending groove and at least one groove, an axial front side front side surface defining said at least one groove on said front side of said joint housing, said front side surface facing said rod, and said at least one groove opening in said axial front side of said joint housing into said interior space and said at least one groove ending with a radially outer end at a spaced location from an outer circumferential contour of said front side of said joint housing, said at least one groove extending in said radial direction, said at least one groove having an outer end, said outer end being located at a radial position outside of said annular exterior surface, said axially extending groove being in communication with said at least one groove, said cavity and said interior space to define a fluid flow path.

15. A joint arrangement in accordance with claim 14, wherein said front side surface has a first radially extending surface portion and a second radially extending surface portion, said first radially extending surface portion defining at least a portion of said at least one groove, said second radially extending surface portion defining at least a portion of said outer circumferential contour, wherein a height of said second radially extending surface portion is greater than a height of said first radially extending surface portion.

16. A joint arrangement in accordance with claim 14, wherein said joint housing has a wrench surface encircling said at least one groove formed in said front side, said gas flow connection comprising at least another groove, said at least another groove being defined by said front side surface, said at least another groove extending in said radial direction, said at least another groove being arranged at a spaced location from said at least one groove, said at least another groove ending with another radially outer end at a spaced location from said outer circumferential contour, said at least another groove having an another outer end, said another outer end being located at a radial position outside of said annular exterior surface.

17. A joint arrangement in accordance claim 14, wherein said outer end of said groove is located at a spaced location from said annular exterior surface, at least a portion of said rod being in contact with at least a portion of said front side, wherein said annular exterior surface has a ring-shaped design and surrounds a radially inner area of radial shoulder portion.

18. A joint arrangement in accordance claim 14, wherein said at least one groove and said axially extending groove extend at right angles to one another and the axially extending groove extends in the direction of or in parallel to said longitudinal axis of said rod.

19. A joint arrangement in accordance with claim 14, wherein said axial pin is arranged at said front side surface, said at least one groove being located between said axial pin and an end portion of said radial shoulder portion.

20. A joint arrangement in accordance claim 14, wherein said joint housing is connected to said rod and said joint housing has a housing recess, which is defined by a housing wall and in which said pivot pin is seated, wherein said front side surface is provided at said joint housing and faces away from or is located opposite an opening, through which said pivot pin protrudes from the joint housing.

* * * * *